US011064217B2

(12) United States Patent
Ahn et al.

(10) Patent No.: US 11,064,217 B2
(45) Date of Patent: Jul. 13, 2021

(54) METHOD AND APPARATUS FOR CODING VIDEO USING MERGING CANDIDATE LIST ACCORDING TO BLOCK DIVISION

(71) Applicant: INTELLECTUAL DISCOVERY CO., LTD., Seoul (KR)

(72) Inventors: Yong Jo Ahn, Seoul (KR); Ho Chan Ryu, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

(21) Appl. No.: 16/647,665

(22) PCT Filed: Sep. 18, 2018

(86) PCT No.: PCT/KR2018/010951
§ 371 (c)(1),
(2) Date: Mar. 16, 2020

(87) PCT Pub. No.: WO2019/054838
PCT Pub. Date: Mar. 21, 2019

(65) Prior Publication Data
US 2020/0275122 A1    Aug. 27, 2020

(30) Foreign Application Priority Data

Sep. 18, 2017 (KR) .......... 10-2017-0119362
Sep. 29, 2017 (KR) .......... 10-2017-0126753

(51) Int. Cl.
*H04N 19/577*    (2014.01)
*H04N 19/593*    (2014.01)
(Continued)

(52) U.S. Cl.
CPC ......... *H04N 19/577* (2014.11); *H04N 19/593* (2014.11); *H04N 19/124* (2014.11);
(Continued)

(58) Field of Classification Search
USPC ...................................... 375/240.12
See application file for complete search history.

(56) References Cited

U.S. PATENT DOCUMENTS 9,161,036 B2    10/2015  Sugio et al.
9,712,840 B2     7/2017  Sugio et al.
(Continued)

FOREIGN PATENT DOCUMENTS

KR    10-2013-0048122 A    5/2013
KR    10-2014-0043730 A    4/2014
(Continued)

OTHER PUBLICATIONS

Helle et al., Block Merging for Quadtree-Based Partitioning in HEVC, Dec. 2012, IEEE Transactions on Circuits and Systems for Video Technology, vol. 22, pp. 1720-1731 (Year: 2012).*
(Continued)

*Primary Examiner* — Marnie A Matt
(74) *Attorney, Agent, or Firm* — Sughrue Mion, PLLC

(57) ABSTRACT

The present invention relates to block merging according to block split among video coding techniques, and a method and an apparatus for coding and decoding a video, in which in generating and modifying a block merging list, spatial merging candidate blocks of the block merging list are changed according to a split type and order of a current coding unit.

6 Claims, 15 Drawing Sheets

(51) Int. Cl.
  *H04N 19/96* (2014.01)
  *H04N 19/124* (2014.01)
  *H04N 19/61* (2014.01)
  *H04N 19/82* (2014.01)
  *H04N 19/91* (2014.01)

(52) U.S. Cl.
  CPC ............ *H04N 19/619* (2014.11); *H04N 19/82* (2014.11); *H04N 19/91* (2014.11); *H04N 19/96* (2014.11)

(56) References Cited

U.S. PATENT DOCUMENTS

| | | | |
|---|---|---|---|
| 9,888,253 B2 | 2/2018 | Sugio et al. | |
| 2013/0003850 A1* | 1/2013 | Sugio | H04N 19/105 375/240.16 |
| 2013/0107962 A1* | 5/2013 | Sim | H04N 19/105 375/240.16 |
| 2013/0114717 A1* | 5/2013 | Zheng | H04N 19/52 375/240.14 |
| 2014/0211857 A1* | 7/2014 | Sugio | H04N 19/513 375/240.16 |
| 2014/0241435 A1* | 8/2014 | Park | H04N 19/58 375/240.16 |
| 2014/0294087 A1* | 10/2014 | Oh | H04N 19/51 375/240.16 |
| 2015/0036748 A1* | 2/2015 | Sugio | H04N 19/593 375/240.16 |
| 2015/0222904 A1* | 8/2015 | Zhou | H04N 19/521 375/240.03 |
| 2015/0271489 A1* | 9/2015 | Sugio | H04N 19/52 375/240.16 |
| 2015/0281726 A1* | 10/2015 | Chono | H04N 19/176 375/240.16 |
| 2017/0280150 A1* | 9/2017 | Sugio | H04N 19/96 |
| 2018/0124416 A1 | 5/2018 | Sugio et al. | |
| 2018/0316934 A1* | 11/2018 | Nam | H04N 19/577 |

FOREIGN PATENT DOCUMENTS

| | | |
|---|---|---|
| KR | 10-2014-0085434 A | 7/2014 |
| KR | 10-2014-0092876 A | 7/2014 |
| KR | 10-2015-0065845 A | 6/2015 |

OTHER PUBLICATIONS

R. Leonardi and H. Chen, "Tree based motion compensated video coding," Proceedings of 1st International Conference on Image Processing, Austin, TX, USA, 1994, pp. 438-442 vol. 2, doi: 10.1109/ICIP.1994.413608. (Year: 1994).*

International Search Report dated Jan. 4, 2019 in counterpart International Patent Application No. PCT/KR2018/010951 (3 pages in English and 3 pages in Korean).

* cited by examiner

FIG. 3
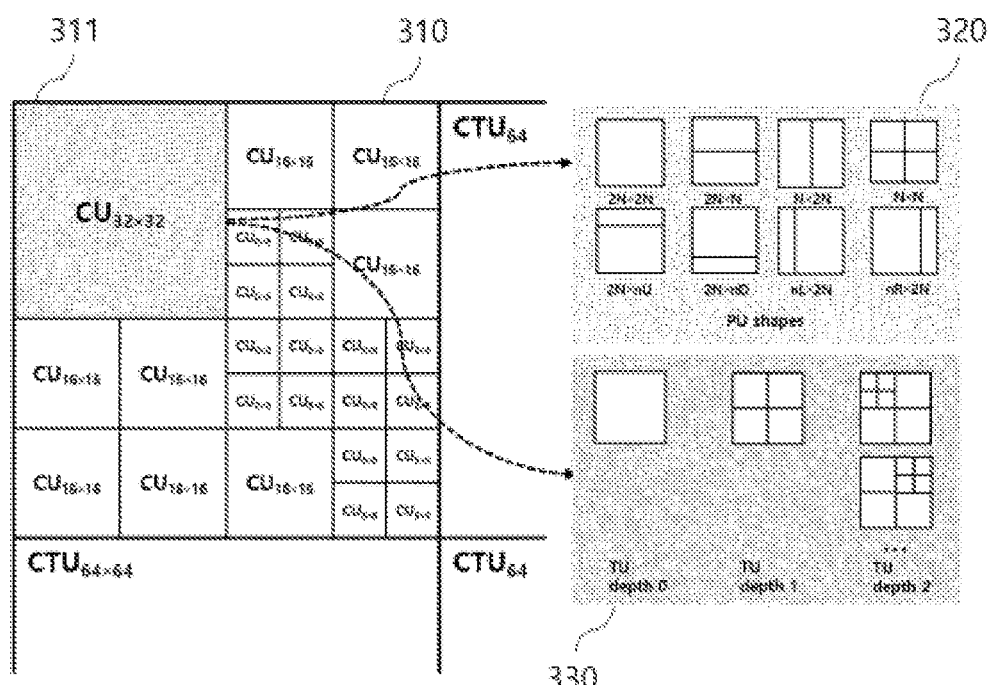
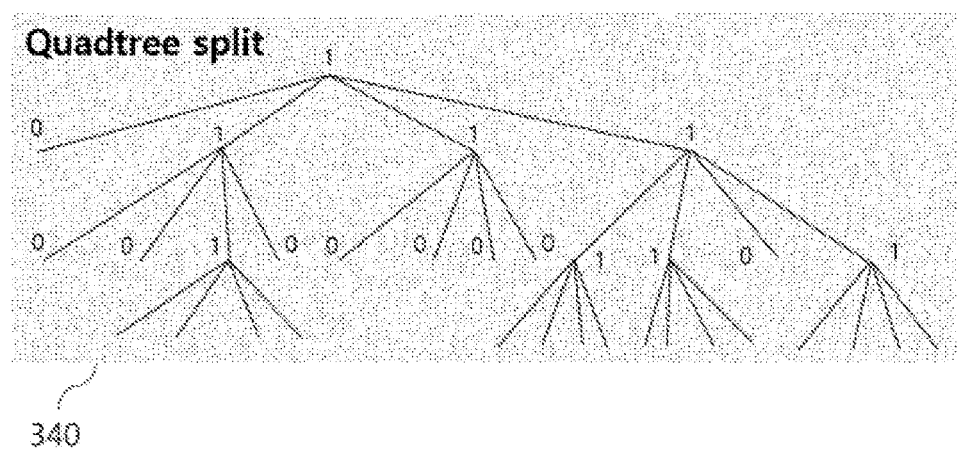

METHOD AND APPARATUS FOR CODING VIDEO USING MERGING CANDIDATE LIST ACCORDING TO BLOCK DIVISION

CROSS REFERENCE TO RELATED APPLICATIONS

This application is a U.S. National Stage Application of International Application No. PCT/KR2018/010951, filed on Sep. 18, 2018, which claims the benefit under 35 USC 119(a) and 365(b) of Korean Patent Application No. 10-2017-0119362, filed on Sep. 18, 2017 and Korean Patent Application No. 10-2017-0126753, filed Sep. 29, 2017, in the Korean Intellectual Property Office, the entire disclosure of which is incorporated herein by reference for all purposes.

TECHNICAL FIELD

The present invention relates to an image processing technology and, more particularly, to a method and apparatus modifying a merging candidate list according to a block split in a video compression technology.

BACKGROUND ART

Recently, as the demand for high resolution and high definition video increases, there is a need for a high efficiency video compression technology for next generation video services. Based on such a need, ISO/IEC MPEG and ITU-T VCEG, which jointly standardized H.264/AVC and HEVC video compression standards, formed the Joint Video Exploration Team (JVET), and has been conducting study and research to enact a new video compression standard since October 2015.

In video compression technology, a block split structure refers to a unit for coding and decoding, and a unit to which main technologies for coding and decoding such as prediction and transformation are applied. As video compression technology evolves, a block size for coding and decoding is gradually increasing, and a block split form supports more various split forms. In addition, video compression is performed using not only the unit for coding and decoding but also a unit subdivided according to a role of the block.

In the HEVC standard, video coding and decoding are performed using a unit block subdivided according to the block split structure in a quadtree form and the role for prediction and transformation. In addition to the block split structure in the quadtree form, various forms of the block split structure, such as Quadtree plus Binary Tree (QTBT) having a form that combines a quadtree and a binary tree, and Multi-Type-Tree (MTT) that combines a triple tree with the QTBT, have been proposed for improving video coding efficiency. Through the support of such various block sizes and various forms of the block split structure, a single picture is split into a plurality of blocks so that coding unit information such as a coding mode corresponding to each block, motion information, and intra-frame prediction direction information is variously represented, whereby the number of bits representing this information greatly increases.

A proposed method to reduce the number of bits required to represent each split block is a block merge technology, which is a technology for transmitting reference information on which neighboring blocks are referred to instead of just using coding information about blocks, which are spatially and temporally adjacent. For block merging, spatially and temporally adjacent blocks are constructed as one merging candidate list according to a certain rule, and the technique of constructing such a merging candidate list is called a Derivation Process for merge candidate list.

DISCLOSURE

Technical Problem

In generating a merging candidate list of current coding and decoding target blocks, the objective of the present invention is to provide a method and apparatus for improving coding efficiency compared to existing video compression technologies by removing duplicate motion information in the merging candidate list and redundancy of syntax that may be caused by merging a target block with a current block However, the technical problem to be achieved by the present exemplary embodiment is not limited to the above technical problems, and other technical problems may exist.

Technical Solution

In order to solve the problem, a video coding method according to the exemplary embodiment of the present invention including: generating a block merging candidate list for motion compensation of a current coding unit, wherein the generating the block merging candidate list includes: adding spatial neighboring merging candidate blocks of the current coding unit to a merging candidate list; adding temporal neighboring merging candidate blocks of the current coding unit to the merging candidate list; adding combined bi-directional merging candidates to the merging candidate list; and adding a zero motion merging candidate to the merging candidate list.

In order to solve the problem, a video coding apparatus according to the exemplary embodiment of the present invention including: an inter prediction unit generating a block merging candidate list for motion compensation of a current coding unit, wherein, in order to generate the block merging candidate list, the inter prediction unit adds spatial neighboring merging candidate blocks of the current coding unit to be added to a merging candidate list, temporal neighboring merging candidate blocks of the current coding unit to be added to the merging candidate list, combined bi-directional merging candidates to be added to the merging candidate list and a zero motion merging candidate.

In order to solve the problem, there is provided the video coding method and apparatus according to the exemplary embodiment of the present invention, wherein, among the spatial neighboring merging candidate blocks of the current coding unit to be added to the merging candidate list, a certain spatial neighboring merging candidate block is removed from the merging candidates, depending on a block split type of a coding unit, a coding order of a split coding unit, and a relation between a size of the split coding unit and a size of the spatial neighboring merging candidate block.

In order to solve the problem, there is provided the video coding method and apparatus according to the exemplary embodiment of the present invention, wherein, among the spatial neighboring merging candidate blocks of the current coding unit to be added to the merging candidate list, a certain spatial neighboring merging candidate block is removed from the merging candidates, depending on a block split type of a coding unit, a coding order of a split coding unit, and a relation between a split depth of the split coding unit and a split depth of the spatial neighboring merging candidate block.

In order to solve the problem, there is provided the video coding method and apparatus according to the exemplary embodiment of the present invention, wherein, among the spatial neighboring merging candidate blocks of the current coding unit to be added to the merging candidate list, a position of a certain spatial neighboring merging candidate block is changed depending on a block split type of a coding unit, a coding order of a split coding unit, and a relation between a size of the split coding unit and a size of the spatial neighboring merging candidate block.

In order to solve the problem, there is provided the video coding method and apparatus according to the exemplary embodiment of the present invention, wherein, among the spatial neighboring merging candidate blocks of the current coding unit to be added to the merging candidate list, a position of a certain spatial neighboring merging candidate block is changed depending on a block split type of a coding unit, a coding order of a split coding unit, and a relation between a split depth of the split coding unit and a split depth of the spatial neighboring merging candidate block.

In order to solve the problem, there is provided the video coding method and apparatus according to the exemplary embodiment of the present invention, wherein, among the spatial neighboring merging candidate blocks of the current coding unit to be added to the merging candidate list, a certain spatial neighboring merging candidate block is added depending on a block split type of a coding unit, a coding order of a split coding unit, and a relation between a size of the split coding unit and a size of the spatial neighboring merging candidate block.

In order to solve the problem, there is provided the video coding method and apparatus according to the exemplary embodiment of the present invention, wherein, in the spatial neighboring merging candidate blocks of the current coding unit to be added to the merging candidate list, a certain spatial neighboring merging candidate block is added depending on a block split type of a coding unit, a coding order of a split coding unit, and a relation between a split depth of the split coding unit and a split depth of the spatial neighboring merging candidate block.

Advantageous Effects

The objective of the present invention is to provide a video coding method and apparatus for improving coding efficiency by removing duplicate motion information in a merging candidate list in a process of generating the merging candidate list of coding and decoding target blocks and redundancy of syntax that may be caused by merging a target block with a current block, in a video coding method and apparatus supporting various block sizes and various types of a block split structure.

According to an exemplary embodiment of the present invention, in the process of generating the merging candidate list of a block which is split into two or more blocks, coding performance may be improved by removing one or more merging candidates from the list according to a certain condition so as to prevent generation of redundant syntax caused by redundant motion information and merging.

DESCRIPTION OF DRAWINGS

FIG. 3 is a drawing illustrating a concept of a quadtree block structure, a coding unit, a prediction unit, and a transformation unit according to the exemplary embodiment of the present invention.

BEST MODE

Figure 1:
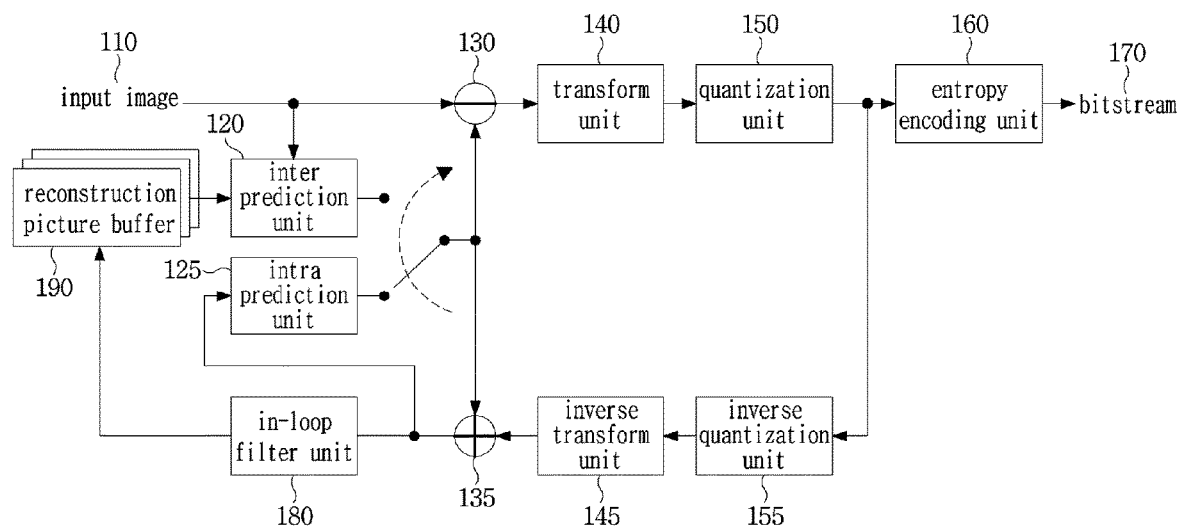
FIG. 1 is a block diagram illustrating a configuration of a video encoding apparatus according to an exemplary embodiment of the present invention.

As described above, a video coding method and apparatus according to exemplary embodiments of the present invention include generating a block merging candidate list for motion compensation of a current coding unit, wherein the block merging candidate list generator includes: adding spatial neighboring merging candidate blocks of the current coding unit to the merging candidate list; adding temporal neighboring merging candidate blocks of the current coding unit to the merging candidate list; adding combined bi-directional merging candidates to the merging candidate list; and adding a zero motion merging candidate to the merging candidate list.

Hereinafter, exemplary embodiments of the present invention will be described in detail with reference to the drawings accompanied in this specification so that those skilled in the art may easily implement the present invention. However, the present invention is not limited to the exemplary embodiments described herein and may be embodied in many different forms. In addition, descriptions which are not necessary to understand the exemplary embodiments will be omitted in order to clearly explain the exemplary embodiments in the drawings, and analogous components are rendered with analogous reference numbers throughout the description of the exemplary embodiments.

In the exemplary embodiments, an expression such as "connect(ed)" is intended to include not only "direct(ly) connect(ed)" but also "electrical(ly) connect(ed)" having a different component in the middle. In addition, throughout the specification, unless explicitly described to the contrary, the word "comprise" and variations such as "comprises" or "comprising" will be understood to imply the inclusion of stated elements but not the exclusion of any other elements.

The term "step of performing ~" or "step of ~" used throughout the present specification does not mean the "step for ~". In addition, it will be understood that, although the terms "first", "second", etc. may be used herein to describe various elements, these elements should not be limited by these terms. These terms are only used for the purpose of distinguishing one element from another element.

In addition, the components shown in the exemplary embodiments of the present invention are shown independently to represent characteristic functions which are different from each other, and do not mean that each component is made of separate hardware or one software component unit. That is, each component is described by listing each component for convenience of description, and at least two of the components may be combined to form one component, or one component may be divided into a plurality of components to perform a function. The integrated and separated exemplary embodiments of each of these components are also included within the scope of the present invention without departing from the spirit of the present invention.

In the various exemplary embodiments of the present invention described herein below, the terms "~part", "~group", "~unit", "~module", "~block", and the like mean a unit for processing at least one function or operation, and may be implemented by a combination of hardware and/or software.

In addition, a coding block refers to a processing unit of a set of target pixels on which coding and decoding are currently performed, and may be used interchangeably as a coding block or a coding unit. In addition, the coding unit refers to the coding unit (CU), and may be referred to comprehensively including the coding block (CB).

In addition, quadtree split refers that one block is split into four independent coding units, and binary split refers that one block is split into two independent coding units.

Hereinafter, the video coding method and apparatus using a merging candidate list generation method based on the block split which is proposed according to the exemplary embodiments of the present invention will be described in detail.

MODE OF INVENTION

FIG. 1 is a block diagram illustrating a configuration of a video encoding method and apparatus according to an exemplary embodiment of the present invention.

The video coding method and apparatus according to the exemplary embodiment may include: an inter prediction unit 120; an intra prediction unit 125; a subtractor 130; a transform unit 140; a quantization unit 150; an entropy encoding unit 160; an inverse transform unit 145; an inverse quantization unit 155, an adder 135; an in-loop filter unit 180; and a reconstruction picture buffer 190.

The inter prediction unit 120 generates a prediction signal by performing motion prediction using an input image 110 and a reconstructed image stored in the reconstruction picture buffer 190.

The intra prediction unit 125 generates a prediction signal by performing spatial prediction using A pixel value of pre-reconstructed neighboring block that is spatially adjacent to a current block to be coded.

The subtractor 130 generates a residual signal by using the input image and the prediction signal generated by the inter prediction unit 120 or the intra prediction unit 125.

The transform unit 140 and the quantization unit 150 generate quantized coefficients by performing transformation and quantization on the residual signal generated by the subtractor 130.

The entropy encoding unit 160 outputs a bitstream by performing entropy coding on coding information such as syntax elements and quantized coefficients defined in the video compression standards.

The inverse transform unit 145 and the inverse quantization unit 155 receive the quantized coefficients, perform inverse quantization and inverse transformation in order, and generate the reconstructed residual signal.

The adder 135 generates a reconstructed signal by using the prediction signal, generated by the inter prediction unit 120 or the intra prediction unit 125, and the reconstructed residual signal.

The reconstructed signal is transmitted to the in-loop filter unit 180 to generate a final reconstructed signal by applying one or more in-loop filters such as a deblocking filter, a Sample Adaptive Offset (SAO), and an Adaptive Loop Filter (ALF), and a final reconstructed signal is stored in the reconstruction picture buffer 190. The reconstructed signal stored in the reconstruction picture buffer 190 may be used as reference signal by the inter prediction unit 120.

Figure 2:
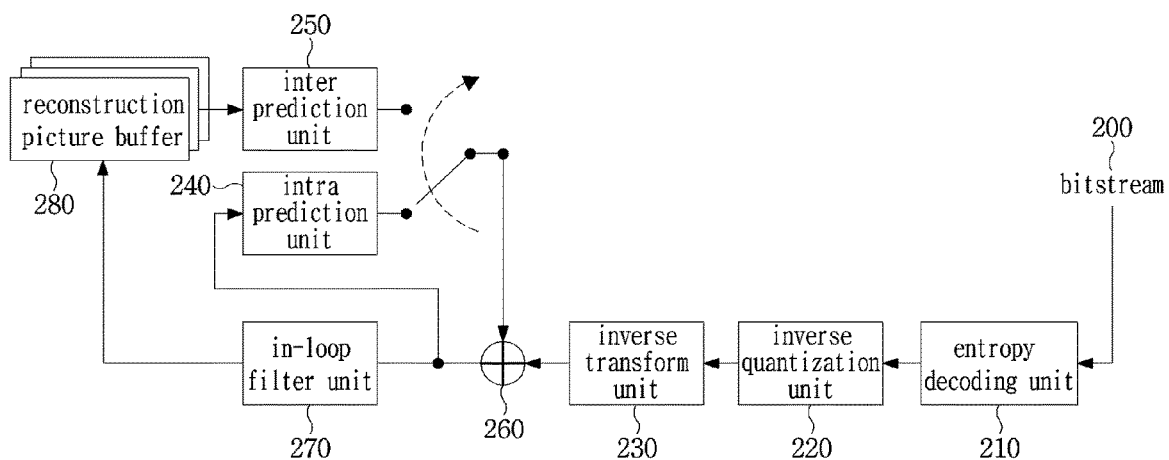
FIG. 2 is a block diagram illustrating a configuration of a video decoding apparatus according to the exemplary embodiment of the present invention.

FIG. 2 is a block diagram illustrating a configuration of a video decoding apparatus and method according to the exemplary embodiment of the present invention.

The video decoding apparatus and method according to the exemplary embodiment may include: an entropy decoding unit 210; an inverse quantization unit 220; an inverse transform unit 230; an intra prediction unit 240; an inter prediction unit 250; an adder 260; an in-loop filter unit 270; and a reconstruction picture buffer 280.

The entropy decoding unit 210 decodes an input bitstream 200 and outputs decoding information such as syntax elements and quantized coefficients.

The inverse quantization unit 220 and the inverse transform unit 230 receive the quantized coefficients, perform inverse quantization and inverse transformation in order, and output a residual signal.

The intra prediction unit 240 generates a prediction signal by performing spatial prediction using a pixel value of pre-decoded neighboring block that is spatially adjacent to the current block to be decoded.

The inter prediction unit 250 generates a prediction signal by performing motion compensation using the motion vector extracted from the bitstream and a reconstructed image stored in the reconstruction picture buffer 280.

The prediction signal which is output from the intra prediction unit 240 and the inter prediction unit 250 is added to the residual signal through the adder 260 to generate the reconstructed signal.

The reconstructed signal is transmitted to the in-loop filter unit 270 to generate the final reconstructed signal by applying one or more in-loop filters such as the deblocking filter, the Sample Adaptive Offset (SAO), and the Adaptive Loop Filter (ALF), and the final reconstructed signal is stored in the reconstruction picture buffer 190. The reconstructed signal stored in the reconstruction picture buffer 190 may be used as the reference signal by the inter prediction unit 120.

FIG. 3 is a drawing illustrating a concept of a quadtree block structure, a coding unit, a prediction unit, and a transformation unit according to the exemplary embodiment of the present invention.

The quadtree block structure according to the exemplary embodiment includes a block which is split into four sub-blocks, wherein each of the four sub-blocks which are split is split again into four sub-blocks as one independent block.

The Coding Unit (CU) may be used as a block unit using the quadtree block split structure according to the exemplary embodiment, and the block at the uppermost level of a CU quadtree block structure is called a Coding Tree Unit (CTU). As an example of the CU quadtree block structure, when one 64×64 CTU 310 is split into CUs at the low level as illustrated in FIG. 3, the corresponding quadtree may be represented by quadtree split information 340. The 64×64 CTU 310 may be split into four 32×32 CUs, and each of the four 32×32 CUs may be independently split again into four CUs, or may maintain a block size without being split.

Information on whether the quadtree blocks are split according to the exemplary embodiment may be represented in a form of flags of 0 and 1, and may be represented as 0 when not split, and as 1 when split. However, in the block split unit at the lowermost level, the information about whether the corresponding block is split is not necessary to be signaled.

One coding unit (CU) according to the exemplary embodiment may be subdivided into a Prediction Unit (PU) which is a unit for prediction and a Transformation Unit (TU) which is a unit for transformation according to roles which are performed.

The PU, which is a unit for prediction according to the exemplary embodiment, may have a total of eight forms, and when represented using an arbitrary length N, the PU may have block sizes of 2N×2N, 2N×N, N×2N, N×N, 2N×nU, 2N×nD, nL×2N, and nR×2N. The 2N×nU means a form which is split into 2N×(½) N size block and 2N×(3/2) N size block, and the 2N×nD means a form which is split into 2N×(3/2) N size block and 2N×(½) N size block. In addition, nL×2N means a form which is split into (½) N×2N size block and (3/2) N×2N size block, and nR×2N means a form which is split into (3/2) N×2N size block and (½) N×2N size block.

The TU, which is a unit for transformation, according to the exemplary embodiment may be split into four TUs at the low level by using the quadtree block split in the same manner as the CU. Whether the quadtree is split for the TU may also be represented in the form of the flags of 0 and 1, and may be represented as 0 when not split, and as 1 when split. However, in the TU split unit at the lowermost level, the information about whether the corresponding block is split is not necessary to be signaled.

Figure 4:
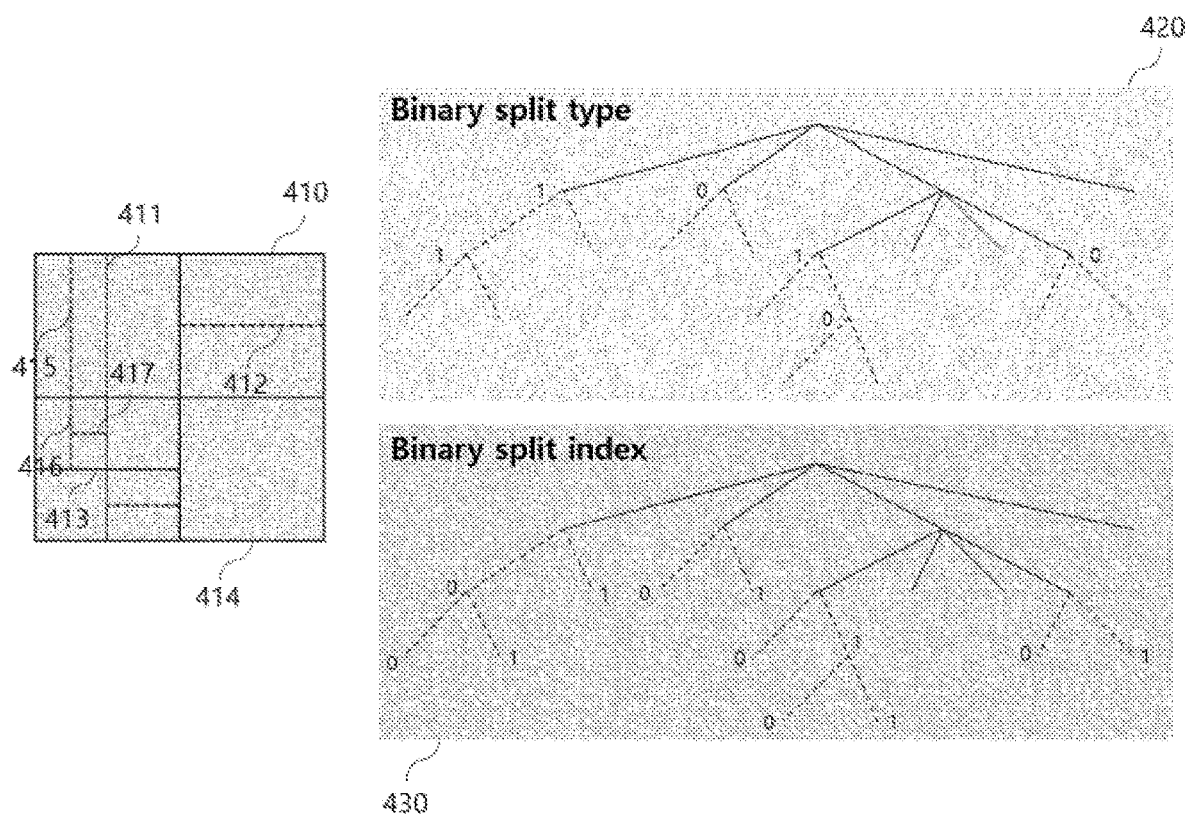
FIG. 4 is a drawing illustrating a concept of a QTBT block structure, a binary split type, and a binary split block index generated by binary splitting according to the exemplary embodiment of the present invention.

FIG. 4 is a drawing illustrating a concept of a QTBT block structure, a binary split type, and a binary split block index generated by binary splitting according to the exemplary embodiment of the present invention.

When there is a block 410 which is split using the QTBT block split according to the exemplary embodiment, the block 410 may be split into four square blocks by using the quadtree block split. In addition, in the QTBT block split, a binary block split may be started from a leaf node of the quadtree generated by the quadtree block split.

In FIG. 4, a first quadtree split block of the block 410 at the uppermost level corresponds to the leaf node of the quadtree and represents an exemplary embodiment in which binary block splitting 411 in the vertical direction is performed. The first binary split block, which is split by performing the binary block splitting 411 in the corresponding vertical direction, represents an exemplary embodiment in which binary block splitting 415 in the vertical direction is performed once again.

A second quadtree split block of the block 410 at the uppermost level corresponds to the leaf node of the quadtree and represents an exemplary embodiment in which binary block splitting 412 in the horizontal direction is performed. The two binary split blocks, which are split by performing the corresponding binary block splitting 412 in the horizontal direction, represents an exemplary embodiment in which no additional binary split is performed.

A third quadtree split block of the block 410 at the uppermost level represents an exemplary embodiment in which one additional quadtree block splitting 413 is performed to generate four quadtree split blocks at the low level. The first quadtree split block, among the four quadtree split blocks at the low level generated as above, corresponds to the leaf node of the quadtree and represents an exemplary embodiment in which binary block splitting 416 in the vertical direction is performed. The second binary split block, among the two binary split blocks which are split by the binary block splitting 416 in the vertical direction, represents an exemplary embodiment in which binary block splitting 417 in the horizontal direction is performed again.

The fourth quadtree split block 414 of the block 410 at the uppermost level corresponds to the leaf node of the quadtree and represents an exemplary embodiment in which binary block splitting is not performed.

According to the exemplary embodiments, the binary block splitting includes performing binary splitting or not at the leaf node of the quadtree. However, when the binary splitting is performed, one of the horizontal binary splitting and the vertical binary splitting is selectively performed. In the block, which is binary-split, additional binary splitting may or may not be performed. In addition, when the binary block splitting is performed at least once, the block which is split by the corresponding binary block splitting may not be split again using the quadtree block splitting.

The reference numeral 420 of FIG. 4 illustrates a binary split type according to the directions of the binary block splitting. The binary split type may be used interchangeably with terms such as a binary split direction, a binary split form, and a binary split type. 0 and 1 may be used to represent that one block is split in one of the horizontal and vertical directions. In the exemplary embodiments, the binary block splitting in the vertical direction is shown as 1 and the binary block splitting in the horizontal direction is shown as 0.

The reference numeral 430 of FIG. 4 illustrates a binary split index for the blocks which are binary-split. The binary split index may be represented using 0 and 1 according to a coding order of the two split blocks generated by binary splitting of a block at the high level. The reference numeral 430 of FIG. 4 illustrates an exemplary embodiment in which, of two split blocks which are binary-split by using the binary split index, the first binary split block is represented by an index 0 and the second binary split block is represented by index 1.

Figure 5:
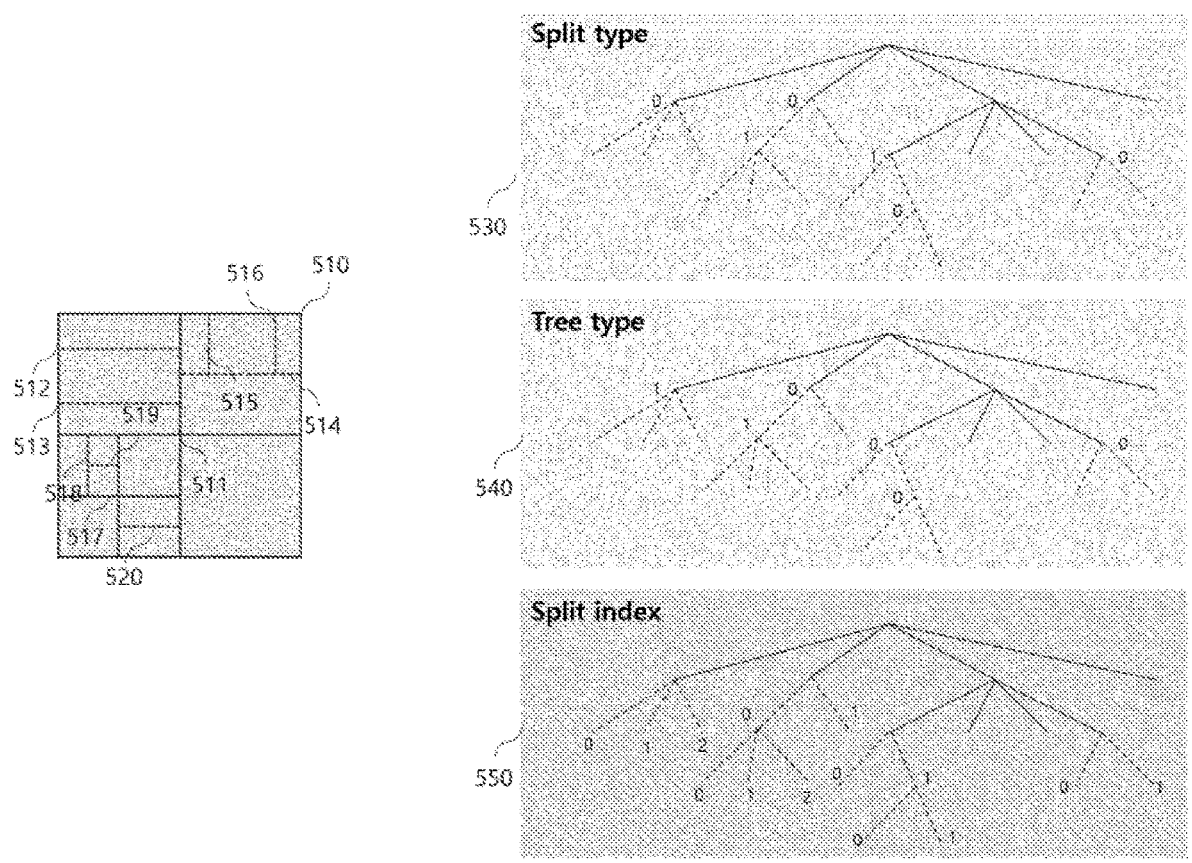
FIG. 5 is a drawing illustrating a concept of an MTT block structure, a split type, and a split block index generated by binary and triple splitting according to the exemplary embodiment of the present invention.

FIG. 5 is a drawing illustrating a concept of an MTT block structure, a split type, and a split block index generated by the binary and triple splitting according to the exemplary embodiment of the present invention.

When a block 510 is split using the MTT block splitting according to the exemplary embodiment, the block 510 may be split into four square blocks by using the quadtree block splitting. In addition, in the MTT block splitting, the binary block splitting or the triple block splitting may be started from the leaf node of the quadtree generated by the quadtree block splitting.

In FIG. 5, the first quadtree split block of the block 510 at the uppermost level corresponds to a leaf node of the quadtree and represents an exemplary embodiment in which triple block splitting 512 and 513 in the horizontal direction are performed. The widths of the three blocks which are split by performing the triple block splitting 512 and 513 in the horizontal direction have the same size N. The heights of the three blocks which are split by performing the triple block splitting 512 and 513 are N/4, N/2, and N/4.

The second quadtree split block of the block 510 at the uppermost level corresponds to a leaf node of the quadtree and represents an exemplary embodiment in which the binary block splitting 514 in the horizontal direction is performed. The first binary split block of the two binary split blocks which are split by performing the binary block splitting 514 in the horizontal direction represents an exemplary embodiment in which the triple block splitting 515 and 516 in the vertical direction are performed once again. The heights of the three blocks, which are split by performing the triple block splitting 515 and 516 in the vertical direction, have the same size M, and the widths of the three blocks which are split as above have M/4, M/2, and M/4.

The reference numeral 530 of FIG. 5 illustrates a split type according to directions of the binary and triple block splitting. The split type may be used interchangeably with terms such as a binary and triple split direction, a binary and triple split form, and a binary and triple split type. 0 and 1 may be used to represent that one block is split in one of the horizontal and vertical directions. In the exemplary embodiment, the block split in the vertical direction is shown as 1 and the block split in the horizontal direction is shown as 0.

The reference numeral 550 of FIG. 5 illustrates a split index for the blocks which are binary-split and triple-split. The binary and triple split index may be represented using 0, 1, and 2 according to a coding order of the two split blocks generated by which a block at the high level is binary-split. The reference numeral 550 of FIG. 5 illustrates an exemplary embodiment in which, of two split blocks which are binary-split by using the binary and triple split index, the first binary split block is represented by an index 0 and the second binary split block is represented by an index 1, and illustrates an exemplary embodiment in which, of the three split blocks which are triple-split, the first triple split block is represented by an index 0, the second triple split block is represented by an index 1, and the third triple split block is represented by an index 2.

Figure 6:
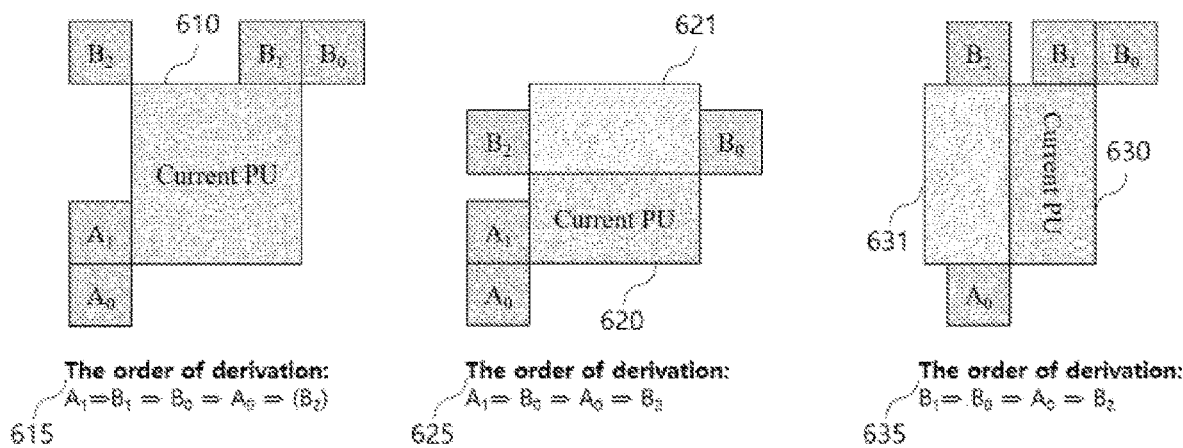
FIG. 6 is a drawing illustrating an example in which spatial neighboring blocks used in generating a merging candidate list are constructed differently according to a split form of a current prediction unit according to the exemplary embodiment of the present invention.

FIG. 6 is a drawing illustrating an example in which spatial neighboring blocks used in generating a merging candidate list are constructed differently according to a split form of a current prediction unit according to the exemplary embodiment of the present invention.

The spatial neighboring block to be used in the generation of the merging candidate list according to the exemplary embodiment may have a maximum of five spatial neighboring block candidates A0, A1, B0, B1, and B2 when the size of the current prediction unit is 2N×2N square PU 610. In addition, in generating the merging candidate list, the order in which the spatial neighboring block candidates are added to the merging candidate list has the order of A1, B1, B0, A0, and B2 as shown in 615 of FIG. 6. However, in the case where A1, B1, B0, and A0 are all added to the spatial merging candidate list according to the maximum number of spatial neighboring blocks that may be added to the spatial merging candidate list, B2 may not be added to the merging candidate list.

The spatial neighboring block to be used in the generation of the merging candidate list according to the exemplary embodiment may have a maximum of four spatial neighboring block candidates A0, A1, B0, B2 when the current prediction unit is the second PU 620 of the PUs 620 and 621 which are split in the horizontal direction such as 2N×N, 2N×nU, and 2N×nD. Compared with that the 2N×2N square PU 610 may have a maximum of five spatial neighboring block candidates A0, A1, B0, B1, and B2, it is possible to check that B1, which is a neighboring block at the position above the current PU 620, has been removed from the spatial neighboring block candidates. When the current PU 620 is merged with the B1 candidate among the merging candidates, PU 621 positioned at the upper end of the current PU 620 is merged therewith. In this case, since the current PU 620 and the PU 621 positioned at the upper end thereof have the same motion data, the two PUs 620 and 621 have the same meaning as one 2N×2N PU 610. Since the existence of a block having the same meaning causes a problem in that redundancy of syntax describing a single block occurs, the spatial neighboring block candidate of B1 is removed in the process of generating the merging candidate list of the second PU 620 of the PUs 620 and 621 which are split in the horizontal direction.

The spatial neighboring block to be used in the generation of the merging candidate list according to the exemplary embodiment may have a maximum of four spatial neighboring block candidates A0, B0, B1, and B2 when the current prediction unit is the second PU 630 of the PUs 630 and 631 which are split in the vertical direction such as N×2N, nL×2N, and nR×2N. Compared with that the 2N×2N square PU 610 may have a maximum of five spatial neighboring block candidates A0, A1, B0, B1, and B2, it is possible to check that A1, which is a neighboring block at the left side of the current PU 630, has been removed from the spatial neighboring block candidates. When the current PU 630 is merged with the A1 candidate among the merging candidates, PU 631 positioned at the left side of the current PU 630 is merged therewith. In this case, since the current PU 630 and the PU 631 positioned at the left side thereof have the same motion data, the two PUs 630 and 631 have the same meaning as one 2N×2N PU 610. Since the existence of a block having the same meaning causes a problem in that redundancy of syntax describing a single block occurs, the spatial neighboring block candidate of A1 is removed in the process of generating the merging candidate list of the second PU 630 of the PUs 630 and 631 which are split in the vertical direction.

Figure 7:
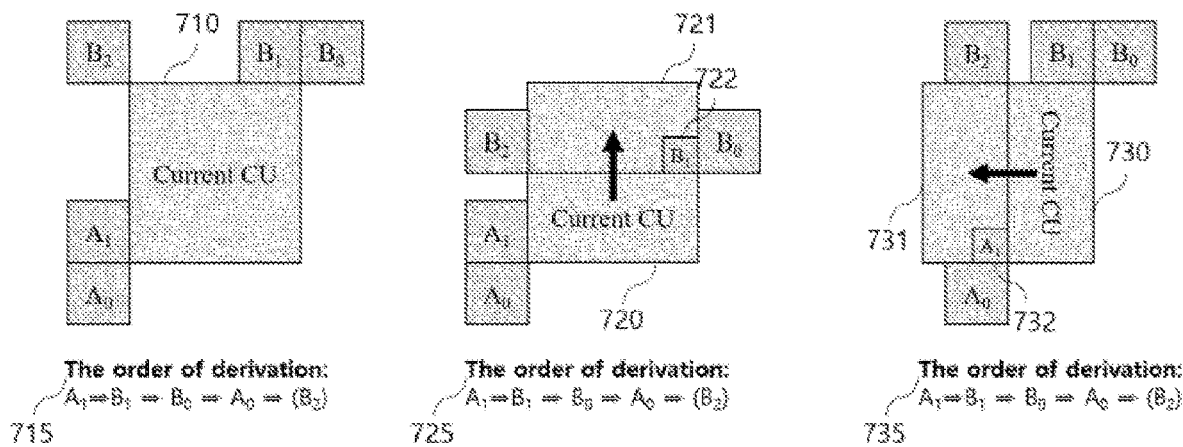
FIG. 7 is a drawing illustrating an example of a case in which the spatial neighboring blocks used in generating the merging candidate list are identically constructed regardless of the split form of the current coding unit according to the exemplary embodiment of the present invention.

FIG. 7 is a drawing illustrating an example of a case in which the spatial neighboring blocks used in generating the merging candidate list are identically constructed regardless of the split type of the current coding unit according to the exemplary embodiment of the present invention.

Unlike the example illustrated in FIG. 6, the example illustrated in FIG. 7 shows about a problem caused by a difference that a block on which the current block merging is performed is one independent coding unit (CU) rather than a prediction unit (PU).

In the case where the current coding unit is a coding unit that is not binary-split, or in the case where the current coding unit is the first coding unit of two coding units that are binary-split, a spatial neighboring block used in generating the merging candidate list according to the exemplary embodiment may have a maximum of five spatial neighboring block candidates A0, A1, B0, B1, and B2. As in the example of the case where the size of the current prediction unit illustrated in FIG. 6 is 2N×2N square PU 610, an example in which up to five spatial neighboring block candidates are provided is shown. Five merging candidate blocks A0, A1, B0, B1, and B2, which are spatially adjacent with the current CU 710 are added to the merging candidate list in the order of A1, B1, B0, A0, and B2, as shown in 715 of FIG. 7. However, in the case where A1, B1, B0, and A0 are all added to the spatial merging candidate list according to the maximum number of spatial neighboring blocks that may be added to the spatial merging candidate list, B2 may not be added to the merging candidate list.

FIG. 7 illustrates, in the process of generating the merging candidate list according to the exemplary embodiment, a problem occurred in case that the current coding unit has the same spatial neighboring block candidates as in the case of the first coding unit of the two coding units which are binary-split or the coding unit which is not binary-split. Herein, the current coding unit is the second binary split coding unit 720 of the horizontal binary split coding units 720 and 721.

In generating a merging candidate list of the second binary split coding unit 720 of the binary split coding units 720 and 721 in the horizontal direction according to the exemplary embodiment of FIG. 7, in the case where the merging candidate list is generated using a maximum of five spatial neighboring block candidates A0, A1, B0, B1, and B2 and is merged with the merging candidate 722 of B1, the second binary split block 720 has the same motion data as the first binary split block 721 and the two binary split blocks are merged with each other. When the two binary split blocks 720 and 721 are merged, the two binary split blocks 720 and 721 have the same physical meaning as one coding unit 710 which is unsplit, thereby causing a problem of generating redundancy of syntax that describes a single block.

In addition, FIG. 7 illustrates a problem in merging the blocks which are binary-split in the vertical direction as well as a problem in merging the blocks which are binary-split in the horizontal direction. FIG. 7 illustrates a problem in that, in generating the merging candidate list of the second binary split coding unit 730 of the two coding units 730 and 731 which are binary-split in the vertical direction as illustrated in FIG. 7, the second binary split coding unit has the same spatial neighboring block candidates as in the case of the first coding unit of the two coding units which are binary-split or the coding unit which is not binary-split.

In generating the merging candidate list of the second binary split coding unit 730 of the coding units 730 and 731 which are binary-split in the vertical direction according to the exemplary embodiment of FIG. 7, when the merging candidate list is generated using a maximum of five spatial neighboring block candidates A0, A1, B0, B1, and B2 and is merged with the merging candidate 732 of A1, the second binary split block 730 has the same motion data as the first binary split block 731 and the two binary split blocks are merged with each other. When the two binary split blocks 730 and 731 are merged, the two binary split blocks 730 and 731 have the same physical meaning as one coding unit 710 which is unsplit, thereby causing a problem of generating redundancy of syntax describing a single block.

Figure 8:
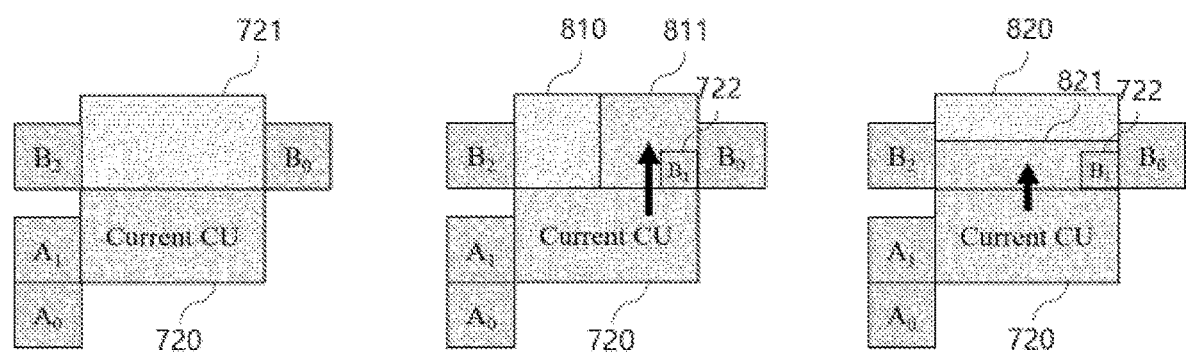
FIG. 8 is a drawing illustrating an example of the spatial neighboring blocks used in generating the merging candidate list of a second binary split block among blocks which are binary-split in a horizontal direction according to the exemplary embodiment of the present invention.

FIG. 8 is a drawing illustrating an example of the spatial neighboring blocks to be used in the merging candidate list of a second binary split block among blocks which are binary-split in a horizontal direction according to the exemplary embodiment of the present invention.

In generating the merging candidate list of the second binary split coding unit of the two binary split coding units in the vertical and horizontal directions as illustrated in FIG. 7, in order to solve the problem of having the same spatial neighboring block candidates as in the case of the first coding unit of the two coding units which are binary-split or the coding unit which is not binary-split, the exemplary embodiment proposed by the present invention is illustrated in FIG. 8 regarding the spatial neighboring blocks to be used to generate the merging candidate list of the second binary split coding unit among the coding units which are binary-split in the horizontal direction.

When the second binary split coding unit 720 and the first binary split coding unit 721 of the coding units which are binary-split in the horizontal direction according to the exemplary embodiment have the same size as shown in FIG. 8, the spatial neighboring block candidates used in the generation of the merging candidate list of the second binary split coding unit 720 of the coding units which are binary-split in the horizontal direction use A0, A1, B0, and B2, except for the merging candidate of B1 which is the neighboring block at the upper end. The reason why the merging candidates of the neighboring block B1 at the upper end is excluded from the spatial neighboring block candidates is to prevent the merge having the same physical meaning as one coding unit which is unsplit.

The condition that the merging candidate of the neighboring block B1 at the upper end is excluded from the spatial neighboring block candidate includes: a case in which a current coding unit (CU) for constituting the merging candidate list results from binary-spliting in the horizontal direction; a case in which the current coding unit is a second binary split coding unit of the coding units which results from binary-spliting; and a case in which the block width and block height of the coding unit 721 corresponding to the merging candidate of the neighboring block B1 at the upper end are the same as the block width and the block height of the current coding unit 720.

A case, in which the block width and the block height of the coding unit corresponding to the merging candidate of the neighboring block B1 at the upper end are the same as the block width and the block height of the current coding unit, has the same meaning as the case in which the binary split depth of the coding unit corresponding to the merging candidate of the neighboring block B1 at the upper end and the binary split depth of the current coding unit are the same, and the above two expressions may be used interchangeably. In other words, the description above means that, in constituting the current merging candidate list of the second binary split coding unit, the first binary split coding unit corresponding to the second binary split coding unit is excluded from the spatial merging candidate blocks.

FIG. 8 illustrates spatial neighboring block candidates to be used for generating the merging candidate list of the second binary split block in the case where a first binary split block which results from binary-spliting in the horizontal direction is split in the vertical direction or the horizontal direction by additional binary-splitting.

When the first binary split coding unit 721, which results from binary-spliting in the horizontal direction, is split in the vertical direction and is composed of two binary split coding units 810 and 811, in constructing the merging candidate list of the second binary split coding unit 720 which results from binary-spliting in the horizontal direction, the merging candidate of B1, which is the neighboring block at the upper end, is not excluded from the spatial neighboring block candidate. The reason is that, even when the first binary split coding unit 721 is split in the vertical direction so that the current coding unit 720 is merged with the target block 811 of the merging candidate 722 of B1 which is the neighboring block at the upper end, the merged result has a different physical meaning from that of the one coding unit which is unsplit.

As in the above exemplary embodiment, when the first binary split coding unit 721, which results from binary-spliting in the horizontal direction, is split in the horizontal direction and is composed of two binary split coding units 820 and 821, in constructing the merging candidate list of the second binary split coding unit 720 which is binary-split in the horizontal direction, the merging candidate of B1, which is the neighboring block at the upper end, is not excluded from the spatial neighboring block candidate. The reason is that, even when the first binary split coding unit 721 is split in the horizontal direction so that the current coding unit 720 is merged with the target block 821 of the merging candidate 722 of B1 which is the neighboring block at the upper end, the merged result has a different physical meaning from that of the one coding unit which is unsplit.

As in the exemplary embodiment in the case where the first binary split block, which results from binary-spliting in the horizontal direction, is split in the vertical direction or the horizontal direction by additional binary-splitting, in generating the merging candidate list of the second binary split block which results from binary-spliting in the horizontal direction, the coding unit corresponding to the merging candidate of the neighboring block B1 at the upper end has a block width and a block height different from the block width and the block height of the current coding unit, and thus the neighboring block B1 at the upper end is not excluded from the spatial neighboring block candidate.

Figure 9:
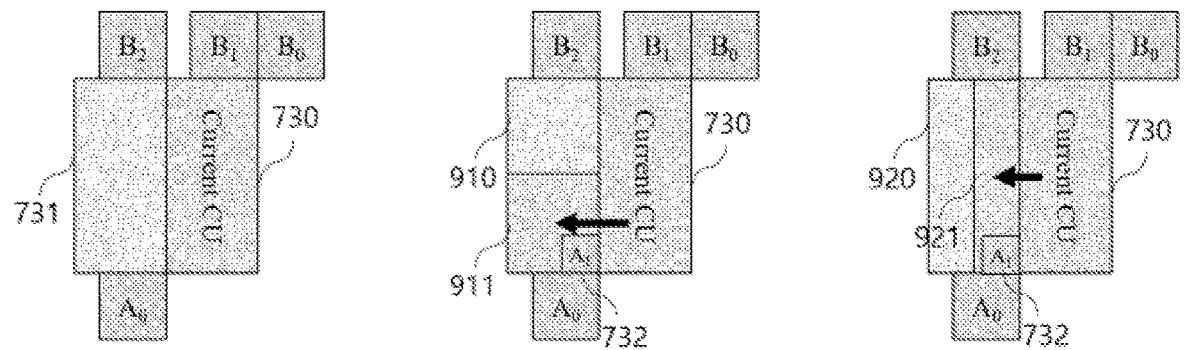
FIG. 9 is a drawing illustrating an example of the spatial neighboring blocks used in generating the merging candidate list of a second binary split block among the blocks which are binary-split in a vertical direction according to the exemplary embodiment of the present invention.

FIG. 9 is a drawing illustrating an example of the spatial neighboring blocks used in generating the merging candidate list of the second binary split block among the blocks which are binary-split in the vertical direction according to the exemplary embodiment of the present invention.

When constructing the merging candidate list of the second binary split coding unit among the coding units which are binary-split in the vertical and horizontal directions as illustrated in FIG. 7, in order to solve the problem of having the same spatial neighboring block candidates as in the case of the first coding unit of the two coding units which are binary-split or the coding unit which is binary-unsplit, the exemplary embodiment proposed by the present invention is illustrated in FIG. 9 regarding spatial neighboring blocks to be used for generating the merging candidate list of the second binary split coding unit among the coding units which are binary-split in the vertical direction.

When the second binary split coding unit 730 among the coding units which results from binary-spliting in the vertical direction and have the same size as the first binary split coding unit 731 as shown in FIG. 9 according to the exemplary embodiment, the spatial neighboring block candidates, used in the generation of the merging candidate list of the second binary split coding unit 730 among the coding units which results from binary-spliting in the vertical direction, use A0, B0, B1, and B2, except for the merging candidate of A1, which is the neighboring block at the left side. The reason why the merging candidates of A1 which is the neighboring block at the left side is excluded from the spatial neighboring block candidates is to prevent the merge having the same physical meaning as one coding unit which is unsplit.

The condition that the merging candidate of A1 which is the neighboring block at the left side is excluded from the spatial neighboring block candidates includes: a case in which the current coding unit (CU) for constituting the merging candidate list results from binary-spliting in the vertical direction; a case in which the current coding unit is the second binary split coding unit among the coding units which results from binary-spliting; and a case in which the block width and block height of the coding unit 731 corresponding to the merging candidate of A1 which is the neighboring block at the left side are the same as the block width and the block height of the current coding unit 730.

The case, in which the block width and the block height of the coding unit corresponding to the merging candidate of A1 which is the neighboring block at the left side are the same as the block width and the block height of the current coding unit, has the same meaning as the case, in which the binary split depth of the coding unit corresponding to the merging candidate of A1 which is the neighboring block at the left side and the binary split depth of the current coding unit are the same. The above two expressions may be used interchangeably. In other words, the description above means that, in constituting the current merging candidate list of the second binary split coding unit, the first binary split coding unit corresponding to the second binary split coding unit is excluded from the spatial merging candidate blocks.

FIG. 9 illustrates spatial neighboring block candidates used for generating a merging candidate list of the second binary split block when the first binary split block which is split in the vertical direction is split in the vertical direction or the horizontal direction by additional binary splitting.

When the first binary split coding unit 731, which results from binary-spliting in the vertical direction, is split in the horizontal direction and is composed of two binary split coding units 910 and 911, in constructing the merging candidate list of the second binary split coding unit 730 which results from binary-spliting in the vertical direction, the merging candidate of A1, which is the neighboring block at the left side, is not excluded from the spatial neighboring block candidate. The reason is that, even when the first binary split coding unit 731 is split in the horizontal direction so that the target block 911 of the merging candidate 732 of A1, which is the neighboring block at the left side, is merged with the current coding unit 730, the merged result has a different physical meaning from that of the one coding unit which is unsplit.

As in the above exemplary embodiment, when the first binary split coding unit 731, which results from binary-spliting in the vertical direction, is split in the vertical direction and is composed of two binary split coding units 920 and 921, in constructing the merging candidate list of the second binary split coding unit 730 which results from binary-spliting in the vertical direction, the merging candidate of A1, which is the neighboring block at the left side, is not excluded from the spatial neighboring block candidates. The reason is that, even when the first binary split coding unit 731 is split in the vertical direction so that the target block 921 of the merging candidate 732 of A1, which is the neighboring block at the left side, is merged with the current coding unit 730, the merged result has a different physical meaning from that of the one coding unit which is unsplit.

As in the exemplary embodiment in the case where the first binary split block, which results from binary-spliting in the vertical direction, is split in the vertical direction or the horizontal direction by additional binary splitting, in generating a merging candidate list of the second binary split block which results from binary-spliting in the vertical direction, the coding unit corresponding to the merging candidate of A1 which is the neighboring block at the left side has a block width and a block height different from the block width and the block height of the current coding unit, and thus A1 which is the neighboring block at the left side is not excluded from the spatial neighboring block candidate.

Figure 10:
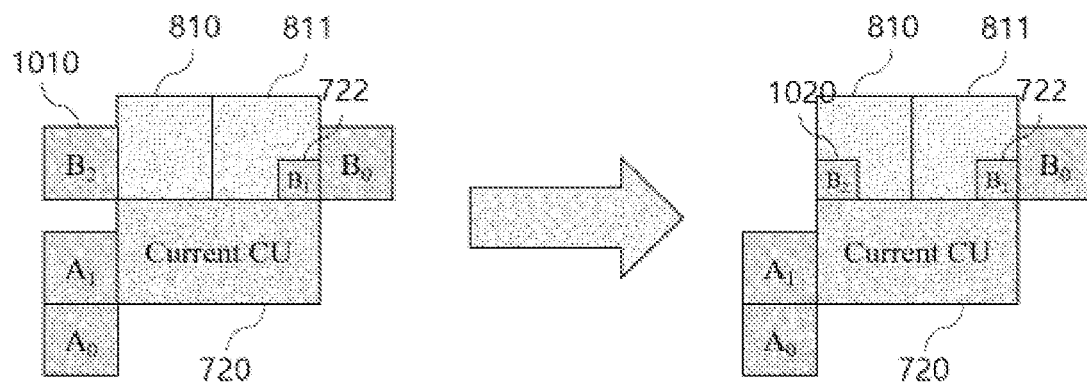
FIG. 10 is a drawing illustrating an example in which a position of the spatial merging candidate blocks is changed according to a split form of a first binary split block to generate the merging candidate list of the second binary split block among the blocks which are binary-split in a horizontal direction according to the exemplary embodiment of the present invention.

FIG. 10 is a drawing illustrating an example in which a position of the spatial merging candidate block is changed according to a split form of a first binary split block to generate the merging candidate list of the second binary split block among the blocks which results from binary-spliting in the horizontal direction according to the exemplary embodiment of the present invention.

In order to generate the merging candidate list of the second binary split block 720 among the blocks which results from binary-spliting in the horizontal direction, the position of the spatial merging candidate block may be changed according to the split form of the first binary split block. FIG. 10 illustrates the exemplary embodiment in which, when the first binary split block is split into binary split blocks 810 and 811 at the low level through binary splitting in the vertical direction, a reference position of B2 1010 which is a merging candidate at the above left side of the spatial merging candidates A0, A1, B0, B1, and B2 of the current coding unit is changed to B2 1020, which is a merging candidate at a position where the first binary split block 810 at the low level of the binary split blocks at the low level enable to refer to.

The position of the merging candidate B2 1010 at the above left side is changed from (xCb−1, yCb−1) to a position (xCb, yCb−1) of B2 1020 which is the merging candidate referring to the first binary split block 810 at the low level. Here, xCb means the x coordinate position of the current coding block, and yCb means the y coordinate position of the current coding block.

As shown in FIG. 10, in the exemplary embodiment in which a position of the spatial merging candidate block used to generate the merging candidate list of the second binary split coding unit is changed according to the form of the first binary split coding unit, it may be merged with the binary split coding unit 810 at the low level of the first binary split coding unit, by changing the position of one spatial merging candidate block while maintaining the total number of merging candidates to five.

Figure 11:
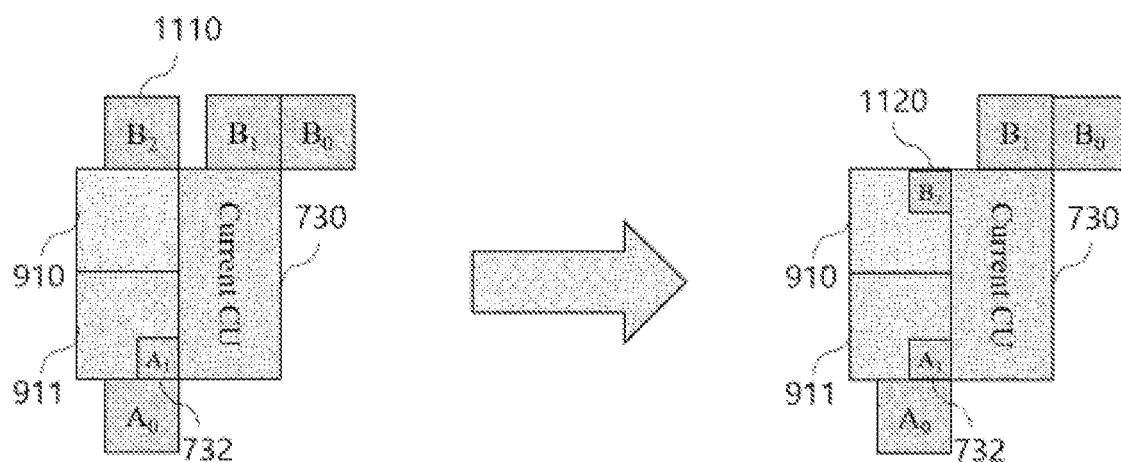
FIG. 11 is a drawing illustrating an example in which the position of the spatial merging candidate blocks is changed according to the split form of the first binary split block to generate the merging candidate list of the second binary split block among the blocks which are binary-split in the vertical direction according to the exemplary embodiment of the present invention.

FIG. 11 is a drawing illustrating an example in which the position of the spatial merging candidate block is changed according to a split form of the first binary split block to generate the merging candidate list of the second binary split block among the blocks which are binary-split in the vertical direction according to the exemplary embodiment of the present invention.

In order to generate the merging candidate list of the second binary split block 730 among the blocks which results from binary-spliting in the vertical direction, the position of the spatial merging candidate block may be changed according to the split form of the first binary split block. FIG. 11 illustrates the exemplary embodiment in which, when the first binary split block is split into binary split blocks 910 and 911 at the low level by binary splitting in the horizontal direction, a reference position of B2 1110 which is a merging candidate at the above left side of the spatial merging candidates A0, A1, B0, B1, and B2 of the current coding unit is changed to B2 1120, which is a merging candidate at a position where the first binary split block 910 at the low level of the binary split blocks at the low level enable to refer to.

The position of the merging candidate B2 1010 at the above left side is changed from (xCb−1, yCb−1) to a position (xCb−1, yCb) of B2 1120 which is the merging candidate referring to the first binary split block 910 at the low level. Here, xCb means the x coordinate position of the current coding block, and yCb means the y coordinate position of the current coding block.

As shown in FIG. 11, in the exemplary embodiment in which a position of the spatial merging candidate block used to generate the merging candidate list of the second binary split coding unit is changed according to the form of the first binary split coding unit, it may be merged with the binary split coding unit 910 at the low level of the first binary split coding unit, by changing the position of one spatial merging candidate block while maintaining the total number of merging candidates to five.

Figure 12:
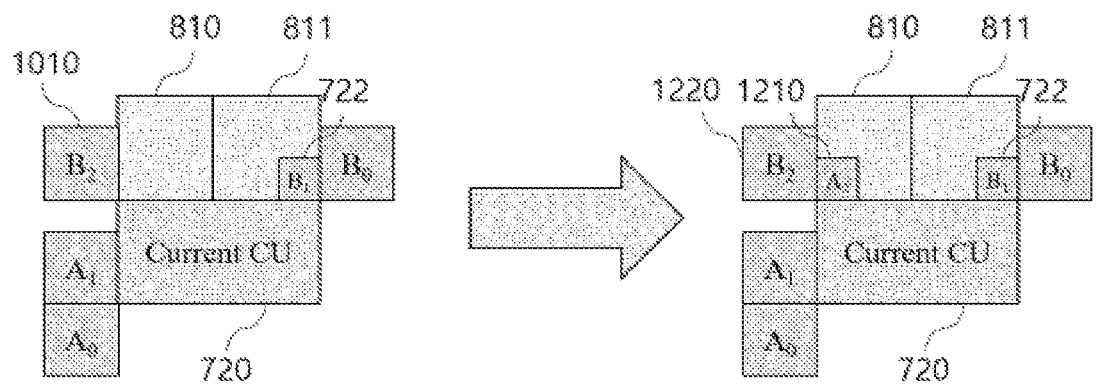
FIG. 12 is a drawing illustrating an example in which the number of the spatial merging candidate blocks is increased according to the split form of the first binary split block to generate the merging candidate list of the second binary split block among the blocks which are binary-split in the horizontal direction according to the exemplary embodiment of the present invention.

FIG. 12 is a drawing illustrating an example in which the number of the spatial merging candidate blocks is increased according to the split form of the first binary split block to generate the merging candidate list of the second binary split block among the blocks which are binary-split in the horizontal direction according to the exemplary embodiment of the present invention.

In order to generate the merging candidate list of the second binary split block 720 among the blocks which results from binary-spliting in the horizontal direction, the number of the spatial merging candidate block may be increased according to the split form of the first binary split block. FIG. 12 illustrates the exemplary embodiment in which, when the first binary split block is split into binary split blocks 810 and 811 at the low level by binary splitting in the vertical direction, a new spatial merging candidate A2 1210 is added to the spatial merging candidates A0, A1, B0, B1, and B2 of the current coding unit. The new spatial merging candidate A2 1210 means a merging candidate whose position can be referenced by the first binary split block 810 at the low level among the binary split blocks at the low level.

The position of the new spatial merging candidate A2 1210 indicates a position referring to the first binary split block 810 at the low level as (xCb, yCb−1). Here, xCb means the x coordinate position of the current coding block, and yCb means the y coordinate position of the current coding block.

As illustrated in FIG. 12, in the exemplary embodiment in which the position of the spatial merging candidate block used for generating the merging candidate list of the second binary split coding unit is changed according to the form of the first binary split coding unit, it may be merged with the binary split coding unit 810 at the low level of the first binary split coding unit, by increasing the number of merging candidates by one.

Figure 13:
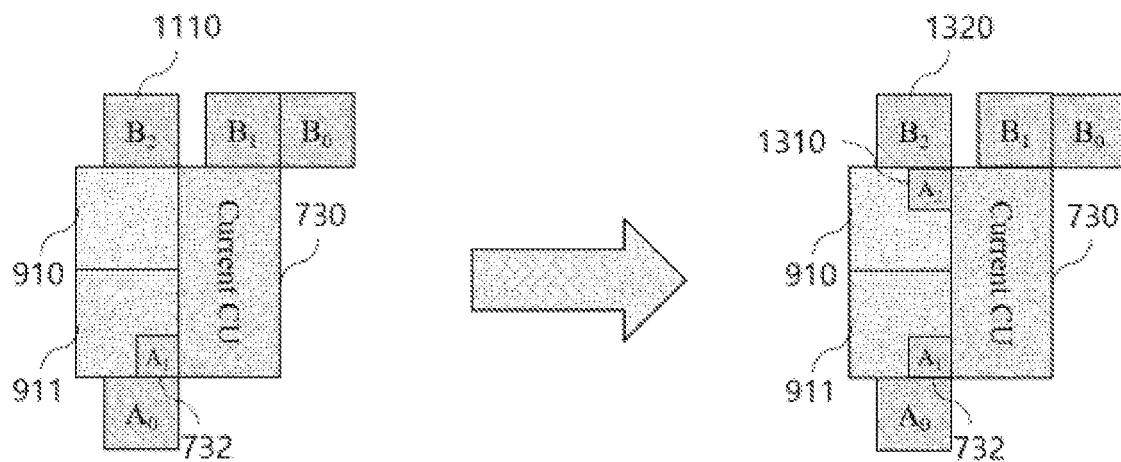
FIG. 13 is a drawing illustrating an example in which the number of the spatial merging candidate blocks is increased according to the split form of the first binary split block to generate the merging candidate list of the second binary split block among the blocks which are binary-split in the vertical direction according to the exemplary embodiment of the present invention.

FIG. 13 is a drawing illustrating an example in which the number of the spatial merging candidate blocks is increased according to the split form of the first binary split block to generate the merging candidate list of the second binary split block among the blocks which are binary-split in the vertical direction according to the exemplary embodiment of the present invention.

The number of the spatial merging candidate block may be increased according to the split form of the first binary split block in order to generate the merging candidate list of the second binary split block 730 among the blocks which results from binary-spliting in the vertical direction according to the exemplary embodiment. The exemplary embodiment illustrated in FIG. 13 shows that, when the first binary split block is split into binary split blocks 910 and 911 at the low level through binary splitting in the vertical direction, a new spatial merging candidate A2 1310 is added to the spatial merging candidates A0, A1, B0, B1, and B2 of the current coding unit. The new spatial merging candidate A2 1310 means a merging candidate whose position can be referenced by the first binary split block 910 at the low level among the binary split blocks at the low level.

The position of the new spatial merging candidate A2 1310 is (xCb−1, yCb), indicating a position referring to the first binary split block 810 at the low level. Here, xCb means the x coordinate position of the current coding block, and yCb means the y coordinate position of the current coding block.

In the exemplary embodiment in which the position of the spatial merging candidate block used for generating the merging candidate list of the second binary split coding unit is changed according to the form of the first binary split coding unit illustrated in FIG. 13, it may be merged with the binary split coding unit 910 at the low level of the first binary split coding unit, by increasing the number of merging candidates by one.

Figure 14:
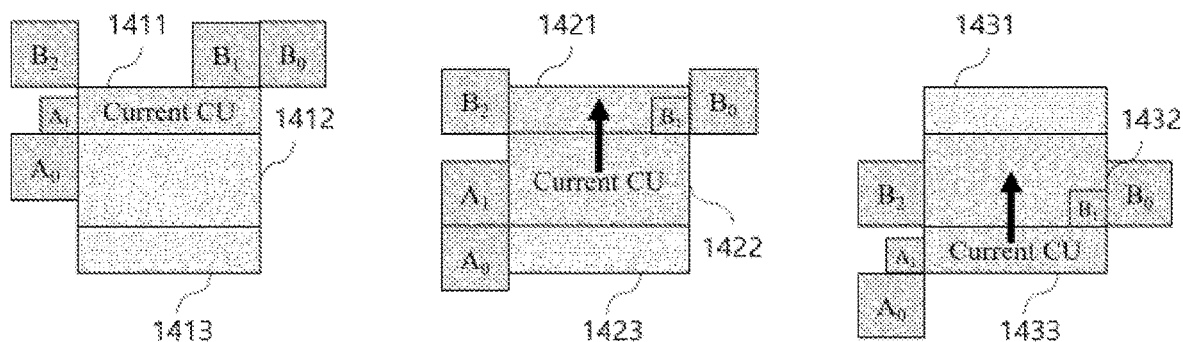
FIG. 14 is a drawing illustrating an example of the spatial merging candidate blocks of each of the split blocks among the blocks which are triple-split in the horizontal direction according to the exemplary embodiment of the present invention.

FIG. 14 is a drawing illustrating an example of the spatial merging candidate blocks of each of the split blocks among blocks which are triple-split in the horizontal direction according to the exemplary embodiment of the present invention.

According to the exemplary embodiment, blocks 1411, 1412, and 1413 which results from triple-split in the horizontal direction may have a maximum of five spatial neighboring block candidates A0, A1, B0, B1, and B2. In addition, in generating the merging candidate list, the order in which the spatial neighboring block candidates are added to the merging candidate list has an order of A1, B1, B0, A0, and B2 as shown in 615 of FIG. 6. However, when A1, B1, B0, and A1 are all added to the spatial merging candidate list according to the maximum number of spatial neighboring blocks that can be added to the spatial merging candidate list, B2 may not be added to the merging candidate list.

According to the exemplary embodiment, when the current block among the blocks which results from triple-split in the horizontal direction is the second block 1422, block merging may be performed using B1 positioned at the upper end of the spatial merging candidates. When merging is performed with the block 1421 at the upper end, which is the first triple split block, two block split forms having a height of (¾)*N and (¼)*N may be represented.

According to the exemplary embodiment, when the current block among the blocks which results from triple-split in the horizontal direction is the third block 1433, block merging may be performed using B1 positioned at the upper end of the spatial merging candidates. When merging is performed with the block 1432 at the upper end, which is the second triple split block, two block split forms having a height of (¼)*N and (¾)*N may be represented.

Figure 15:
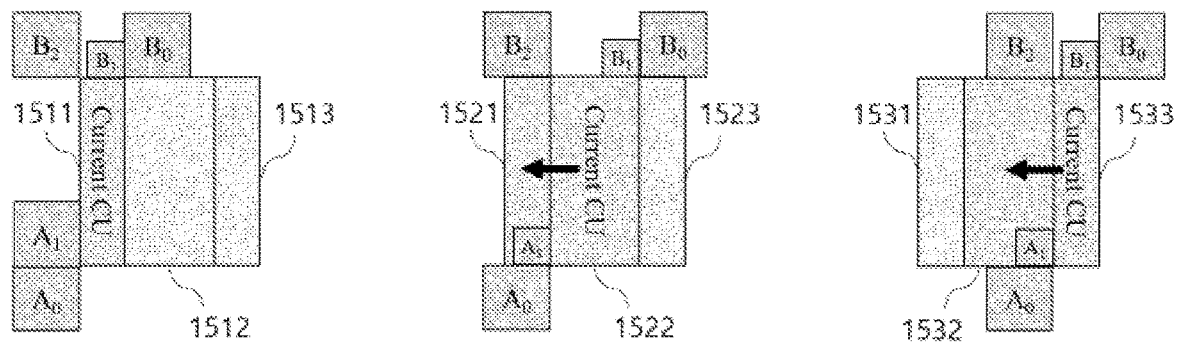
FIG. 15 is a drawing illustrating an example of the spatial merging candidate blocks of each of the split blocks among the blocks which are triple-split in the vertical direction according to the exemplary embodiment of the present invention.

FIG. 15 is a drawing illustrating an example of the spatial merging candidate blocks of each of the split blocks among the blocks which are triple-split in the vertical direction according to the exemplary embodiment of the present invention.

According to the exemplary embodiment, blocks 1511, 1512, and 1513 which results from triple-split in the vertical direction may have a maximum of five spatial neighboring block candidates A0, A1, B0, B1, and B2. In addition, in generating a merging candidate list, the order in which the spatial neighboring block candidates are added to the merging candidate list has an order of A1, B1, B0, A0, and B2 as shown in 615 of FIG. 6. However, when A1, B1, B0, and A1 are all added to the spatial merging candidate list according to the maximum number of spatial neighboring blocks that may be added to the spatial merging candidate list, B2 may not be added to the merging candidate list.

According to the exemplary embodiment, when the current block among the blocks which results from triple-split in the vertical direction is the second block 1522, block merging may be performed using A1 positioned at the left side of the spatial merging candidates. When merging is performed with the block 1521 at the left side, which is the first triple split block, two block split forms having a height of (¾)*N and (¼)*N may be represented.

According to the exemplary embodiment, when the current block among the blocks which results from triple-split in the vertical direction is the third block 1533, block merging may be performed using A1 positioned at the left side of the spatial merging candidates. When merging is performed with the block 1532 at the left side, which is the second triple split block, two block split forms having a height of (¼)*N and (¾)*N may be represented.

Figure 16:
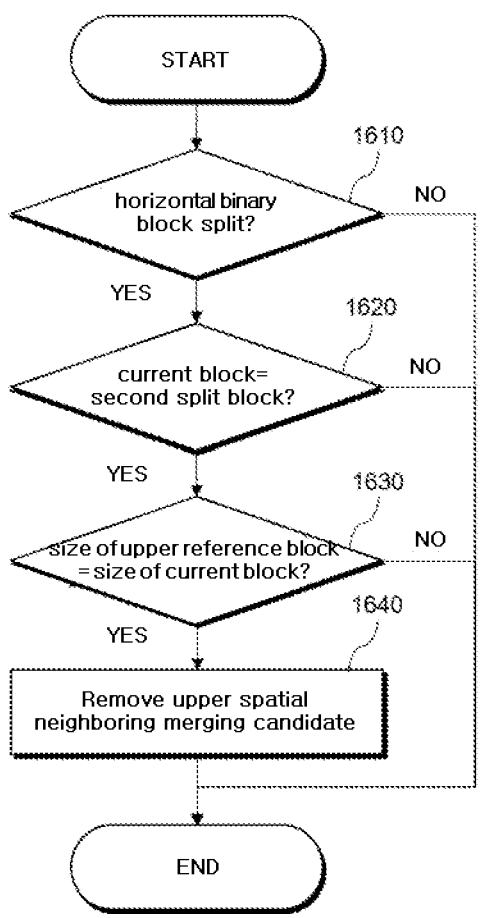
FIG. 16 is a flowchart illustrating a removal of a spatial neighboring merging candidate at a left side of a second split block among the blocks which are binary-split in the vertical direction according to the exemplary embodiment of the present invention.

FIG. 16 is a flowchart illustrating a removal of the upper end spatial neighboring merging candidate of the second split block among the blocks which are binary-split in the horizontal direction according to the exemplary embodiment of the present invention.

According to the exemplary embodiment, the generation of the spatial merging candidate of the second binary split coding unit among the coding units which results from binary-split in the horizontal direction includes: a step 1610 of checking whether a binary block split in the horizontal direction is or not, a step 1620 of checking whether a current block is a second split block; a step 1630 of checking equality of the reference block size at the upper end and the current block size; and a step 1640 of excluding the spatial neighbor merging candidate at the upper end from the spatial merging candidate list in the case where the condition of binary block splitting in the horizontal direction is satisfied and the condition of the second split block is satisfied, and the size of the reference block at the upper end and the current block is the same.

In constructing the spatial merging candidate list, in generating the spatial merging candidate of the second binary split coding unit 720 among the coding units which results from binary-spliting in the horizontal direction as shown in FIG. 7, the reference block at the upper end is meant to be a block that includes the position of B1 722.

Figure 17:
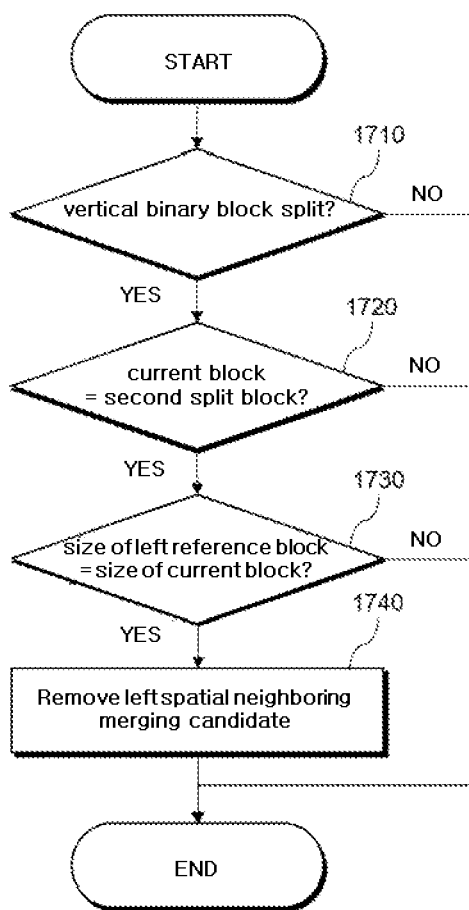
FIG. 17 is a flowchart illustrating a removal of the spatial neighboring merging candidate at an upper end of the second split block among the blocks which are binary-split in the horizontal direction according to the exemplary embodiment of the present invention.

FIG. 17 is a flowchart illustrating a removal of a spatial neighboring merging candidate at the left side of a second split block among the blocks which are binary-split in the vertical direction according to the exemplary embodiment of the present invention.

According to the exemplary embodiment, the generation of the spatial merging candidate of the second binary split coding unit among the coding units which results from binary-spliting in the vertical direction includes: a step 1710 of checking whether a binary block split in the vertical direction is or not; a step 1720 of checking whether a current block is a second split block; a step 1730 of checking equality of the reference block size at the left side and the current block size; and a step 1740 of excluding the spatial neighbor merging candidate at the left side from the spatial merging candidate list in the case where the condition of binary block splitting in the vertical direction is satisfied and the condition of the second split block is satisfied, and the size of the reference block at the left side and the current block is the same.

In constructing the spatial merging candidate list, in generating the spatial merging candidate of the second binary split coding unit 730 among the coding units which results from binary-split in the vertical direction as shown in FIG. 7, the reference block at the left side is meant to be a block that includes the position of A1 732.

Figure 18:
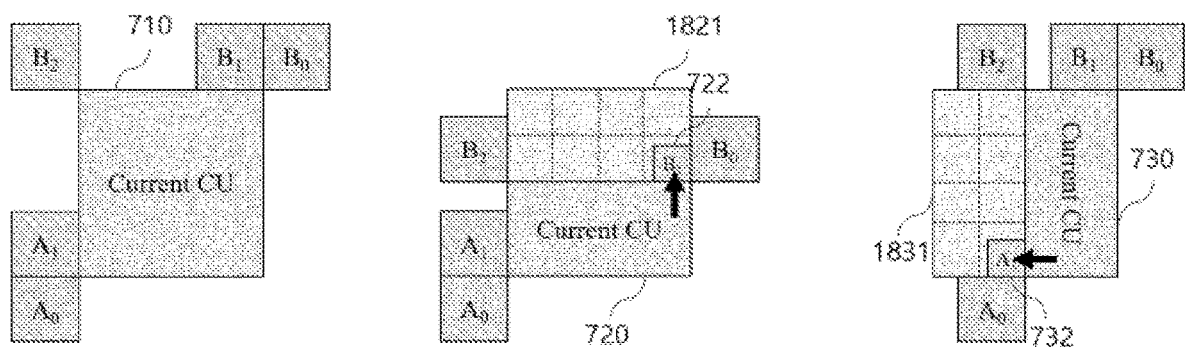
FIG. 18 is a drawing illustrating an example of merging blocks that perform sub-block unit motion compensation among the spatial neighboring blocks used in generating the merging candidate list according to the exemplary embodiment of the present invention.

FIG. 18 is a drawing illustrating an example of merging blocks that perform sub-block unit motion compensation among the spatial neighboring blocks used in generating the merging candidate list according to the exemplary embodiment of the present invention.

Unlike the example shown in FIGS. 8 and 9, the example shown in FIG. 18 illustrates a method of constructing the merging candidate when a spatial neighboring block merges the blocks performing sub-block unit motion compensation, even when the current block is the second binary split unit which results from binary-spliting in the horizontal direction or in the vertical direction.

According to the exemplary embodiment of FIG. 18, in generating a merging candidate list of the second binary split coding unit 720 of the coding units 1821 and 720 which results from binary-spliting in the horizontal direction, a case of merging a block 1821 at the upper end of the spatial neighboring block candidates is illustrated. When the block 1821 positioned at the upper end of the current coding unit 720 is subjected to sub-block unit motion compensation, it means that the motion information of the corresponding block 1821 has one or a plurality of different motion information. In other words, the block 1821 positioned at the upper end of the current coding unit 720 may be determined to be a block in which motion prediction is performed by split into a plurality of sub-blocks. As in the case of being further split into the split blocks 810, 811, 820, and 821 as shown in FIG. 8, it may be also interpreted such that the size of the second binary split coding unit 720 which is the current coding unit and the size of block 1821 positioned at the upper end of the current coding unit 720 are different from each other. Therefore, in generating the spatial merging candidate list of the second binary coding unit 720 of the coding units 1821 and 720 which results from binary-spliting in the horizontal direction, even when the block 1821 at the upper end has the same size as the current coding unit 720, the merging candidate B1 722 at the corresponding position may be added to the spatial merging candidate list in the case where the block 1821 at the upper end is a block performing sub-block unit motion compensation.

According to the exemplary embodiment of FIG. 18, in generating a merging candidate list of the second binary split coding unit 730 of the coding units 1831 and 730 which results from binary-spliting in the vertical direction, a case of merging the block 1831 at the left side of the spatial neighboring block candidates is illustrated. When the block 1831 positioned at the left side of the current coding unit 730 is subjected to sub-block unit motion compensation, the motion information of the corresponding block 1831 is meant to have one or a plurality of different motion information. In other words, the block 1831 positioned at the left side of the current coding unit 730 may be determined to be a block in which motion prediction is performed by split into a plurality of sub-blocks. As in the case of being further split into the split blocks 910, 911, 920, and 921 as shown in FIG. 9, it may be also interpreted such that the size of the second binary split coding unit 730 which is the current coding unit and the size of block 1831 positioned at the left side of the current coding unit 730 are different from each other. Therefore, in generating the spatial merging candidate list of the second binary coding unit 730 of the coding units 1831 and 730 which results from binary-spliting in the vertical direction, even when the block 1831 at the left side has the same size as the current coding unit 730, the merging candidate A1 732 at the corresponding position may be added to the spatial merging candidate list in the case where the block 1831 at the left side is a block performing sub-block unit motion compensation.

Figure 19:
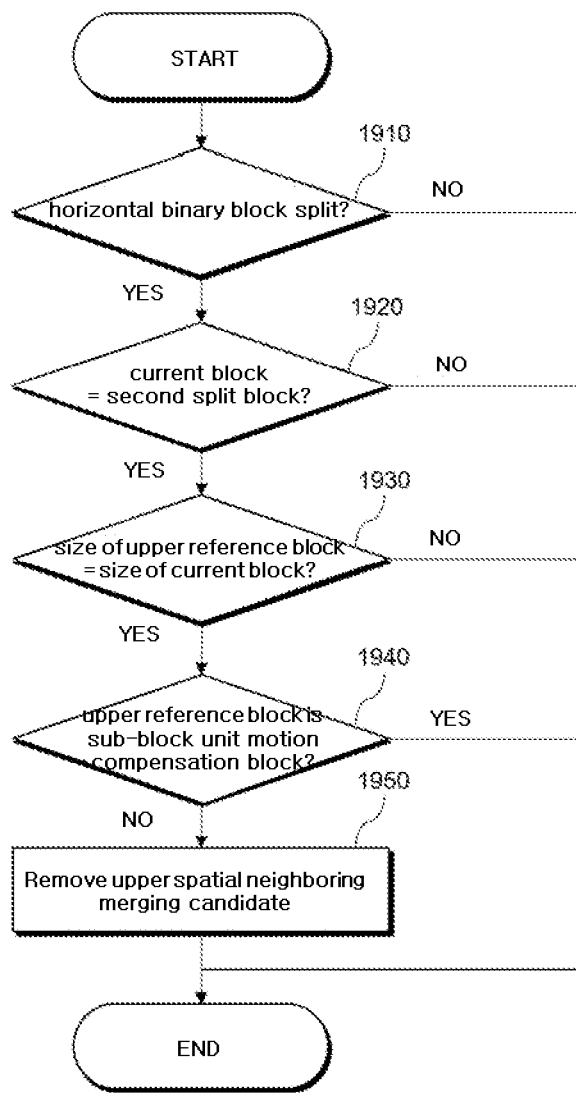
FIG. 19 is a flowchart illustrating a removal of the spatial neighboring merging candidate at the upper end of the second split block among the blocks which are binary-split in the horizontal direction according to the exemplary embodiment of the present invention.

FIG. 19 is a flowchart illustrating a removal of the spatial neighboring merging candidate at the upper end of the second split block among the blocks which are binary-split in the horizontal direction according to the exemplary embodiment of the present invention.

According to the exemplary embodiment, the generation of the spatial merging candidate of the second binary split coding unit among the coding units which results from binary-spliting in the horizontal direction includes: a step 1910 of checking whether a binary block split in the horizontal direction is or not, a step 1920 of checking whether a current block is a second split block; a step 1930 of checking equality of the reference block size at the upper end and the current block size; a step 1940 of checking whether the reference block at the upper end is a sub-block unit motion compensation block. A step 1950 of excluding the spatial neighbor merging candidate at the upper end from the spatial merging candidate list is further included in the case where the condition of the binary block splitting in the horizontal direction is satisfied, in the case where the condition of the second split block is satisfied, in the case where the size of the reference block at the upper end is the same as the size of the current block, and in the case where the reference block at the upper end is not the sub-block unit motion compensation block. Whereas, even when the condition of the binary block splitting in the horizontal direction is satisfied, the condition of the second split block is satisfied, and the reference block at the upper end and the current block have the same size, the step 1950 of excluding the spatial neighbor merging candidate at the upper end from the spatial merging candidate list is not included in the case where the reference block at the upper end is a sub-block unit motion compensation block.

In constructing the spatial merging candidate list, in generating the spatial merging candidate of the second binary split coding unit 720 among the coding units which results from binary-spliting in the horizontal direction as shown in FIG. 18, the reference block at the upper end is meant to be a block that includes the position of B1 722.

Figure 20:
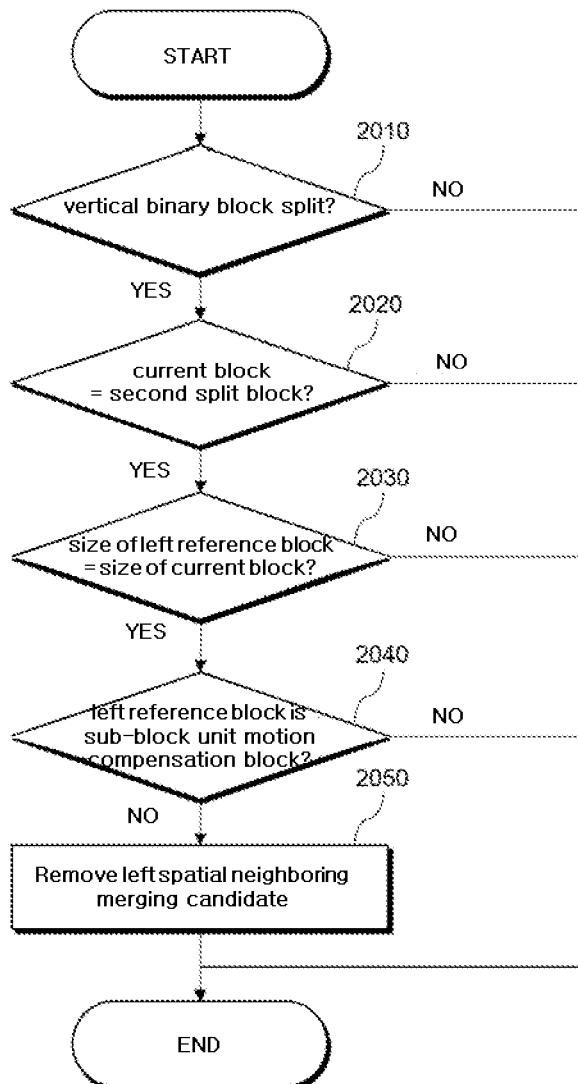
FIG. 20 is a flowchart illustrating a removal of the spatial neighboring merging candidate at the upper end of the second split block among the blocks which are binary-split in the vertical direction according to the exemplary embodiment of the present invention.

FIG. 20 is a flowchart illustrating a removal of the spatial neighboring merging candidate at the upper end of the second split block among the blocks which are binary-split in the vertical direction according to the exemplary embodiment of the present invention.

According to the exemplary embodiment, generation of a spatial merging candidate of a second binary split coding unit among the coding units which results from binary-spliting in the vertical direction includes: a step 2010 of checking whether a binary block split in the vertical direction is or not, a step 2020 of checking whether a current block is a second split block; a step 2030 of checking equality of the reference block size at the left side and the current block size; a step 2040 of checking whether the reference block at the left side is a sub-block unit motion compensation block. A step 2050 of excluding the spatial neighbor merging candidate at the left side from the spatial merging candidate list is further included in the case where the condition of the binary block splitting in the vertical direction is satisfied, in the case where the condition of the second split block is satisfied, in the case where the size of the reference block at the left side and the size of the current block are the same, and in the case where the reference block at the left side is not the sub-block unit motion compensation block. Whereas, even when the condition of the binary block splitting in the vertical direction is satisfied, the condition of the second split block is satisfied, and the reference block at the left side and the current block have the same size, the step 2050 of excluding the spatial neighbor merging candidate at the left side from the spatial merging candidate list is not included in the case where the reference block at the left side is a sub-block unit motion compensation block.

In constructing the spatial merging candidate list, in generating the spatial merging candidate of the second binary split coding unit 730 among the coding units which results from binary-spliting in the vertical direction as shown in FIG. 18, the reference block at the left side is meant to be a block that includes the position of A1 732.

Figure 21:
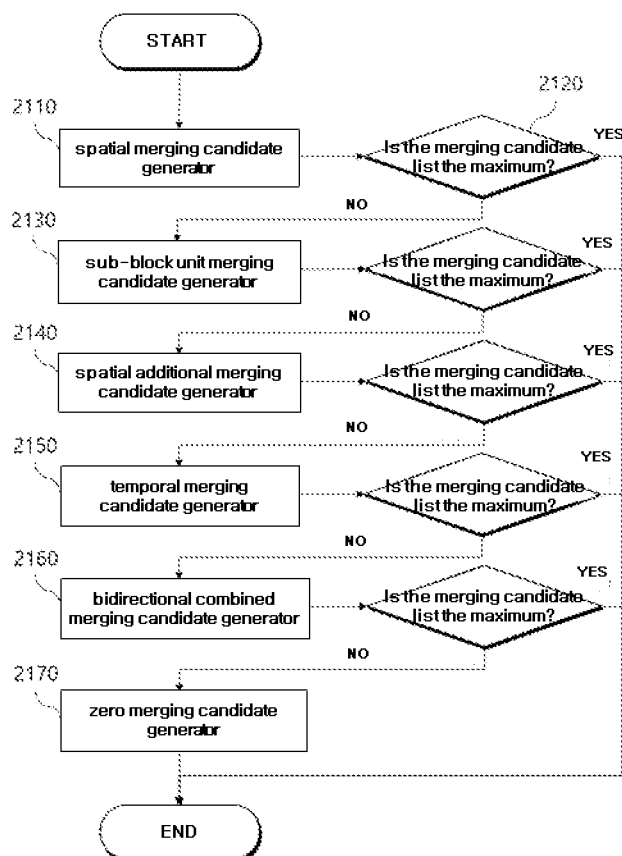
FIG. 21 is a flowchart illustrating generation of the merging candidate list according to the exemplary embodiment of the present invention.

FIG. 21 is a flowchart illustrating generation of the merging candidate list according to the exemplary embodiment of the present invention.

According to the exemplary embodiment, a merging candidate list generator performing generation of the merging candidate list is configured to include: a spatial merging candidate generator 2110; a examination unit 2120 checking whether to enable to add to a merging candidate list; a sub-block unit merging candidate generator 2130; a spatial additional merging candidate generator 2140; a temporal merging candidate generator 2150; a bi-directional combined merging candidate generator 2160; and a zero merging candidate generator 2170.

In generating the merging candidate list according to the exemplary embodiment, the spatial merging candidate generator 2110 determines a merging candidate that may be addable to the merging candidate list among spatially adjacent neighboring blocks of the current block, this means a method of constructing coding information of spatially adjacent neighboring blocks of the current block into a list. The coding information used for merging indicates coding information, which includes: motion information of the spatially adjacent neighboring blocks of the current block; prediction direction; index information of a corresponding reference picture in reference lists according to the prediction direction; and illumination compensation information, wherein merging the current block with the merging candidate block may be performed by using the coding information.

The spatial merging candidate generator 2110 using the spatially adjacent neighboring blocks of the current block includes: examining whether or not the neighboring blocks that are spatially adjacent based on the current block 710 of FIG. are merged in a certain order; and adding the merging candidate to the merging candidate list when possibility of merging is true. The regular order may include using a fixed order or using a different order depending on the size of the block and the split direction of the block. The above step of examining whether or not merging is possible is the step that examines whether two different blocks is merged by using coding information of the corresponding merging candidate and coding information of the current block as shown in FIGS. 16, 17, 19, and 20. The coding information of the merging candidate and the coding information of the current coding block may include: whether a coding unit of a merging candidate position exists; whether the coding unit of the merging candidate position performs inter-frame prediction; whether the coding unit of the merging candidate position and the current coding block are in different merge regions. In addition, as the exemplary embodiment shown in FIGS. 16 and 17 according to the block split of the current coding unit, the coding information of the merging candidate and the coding information of the current coding block may include: binary split direction and whether the block is binary-split; whether the current coding unit is the second split block; and whether the block size is the same as the upper end or the left side block according to the split direction. In addition, as the exemplary embodiment shown in FIGS. 19 and 20, the coding information further includes whether the upper end or the left side reference block, which are currently used as a merging candidate, performs the sub-block unit motion compensation.

In the sub-block unit motion compensation, the reference block splits one coding unit into a plurality of sub-blocks with a smaller size, the decoder performs additional motion correction by using motion information obtained from the bitstream or motion information corresponding to a coding unit generated by the decoder through merging, and performs motion compensation using different corrected motion information by the sub-block unit.

INDUSTRIAL APPLICABILITY

The present invention is applicable to the field of high efficiency image processing technology.

The invention claimed is:

1. An image decoding method performed by an image decoding apparatus, the method comprising:
    splitting a first coding block into a plurality of second coding blocks according to a tree-based split structure, wherein the tree-based split structure includes a triple-tree split structure;
    splitting a second coding block into two sub-regions based on block split type information;
    determining motion information of a current sub-region among the two sub-regions from one of a plurality of merging candidates; and
    generating a prediction signal of the current sub-region based on the motion information,
    wherein the plurality of merging candidates comprise at least any one of
    a spatial neighboring merging candidate,
    a temporal neighboring merging candidate, and
    a zero motion merging candidate, and
    wherein when the second coding block is split into the two sub-regions in a horizontal direction according to the block split type information and the current sub-region is a bottom sub-region among the two sub-regions, a number of the merging candidates available for motion compensation of the current sub-region among the two sub-regions is less than a number of merging candidates available for motion compensation of a top sub-region among the two sub-regions.

2. The image decoding method of claim 1, wherein the tree-based split structure further includes a quad-tree split structure and a binary-tree split structure,
    wherein a split according to the binary-tree split structure or the triple-tree split structure is started from a leaf node of the quad-tree split structure, and
    wherein when the split according to the binary-tree split structure is performed at least once, a block which is split according to the binary-tree split structure is not split again according to the quad-tree split structure.

3. The method of claim 1, wherein the triple-tree split structure is a block split of splitting, based on two split lines, one coding block into three coding blocks.

4. The method of claim 3, wherein the two split lines do not cross a center of the one coding block,
    wherein one of the three coding blocks has a size greater than a size of the other two of the three coding blocks,
    wherein the other two of the three coding blocks have the same size, and
    wherein the one of the three coding blocks is located between the other two of the three coding blocks.

5. An image decoding apparatus comprising:
    an inter prediction unit splitting a first coding block into a plurality of second coding blocks according to a tree-based split structure, wherein the tree-based split structure includes a triple-tree split structure, splitting a second coding block into two sub-regions based on block split type information, determining motion information of a current sub-region among the two sub-regions from one of a plurality of merging candidates and generating a prediction signal of the current sub-region based on the motion information,
    wherein the plurality of merging candidates comprise at least any one of
    a spatial neighboring merging candidate,
    a temporal neighboring merging candidate,
    and
    a zero motion merging candidate to be added to the merging candidate list, and
    wherein when the second coding block is split into the two sub-regions in a horizontal direction according to the block split type information and the current sub-region is a bottom sub-region among the two sub-regions, a number of the merging candidates available for motion compensation of the current sub-region among the two sub-regions is less than a number of merging candidates available for motion compensation of a top sub-region among the two sub-regions.

6. An image encoding method performed by an image encoding apparatus, the method comprising:
    splitting a first coding block into a plurality of second coding blocks according to a tree-based split structure, wherein the tree-based split structure includes a triple-tree split structure;
    splitting the second coding block into two sub-regions; and
    generating a prediction signal of a current sub-region among the two sub-regions based on motion information of the current sub-region,
    wherein the motion information of the current sub-region is determined from one of a plurality of merging candidates,
    wherein the plurality of merging candidates comprises at least any one of a spatial neighboring merging candidate, a temporal neighboring merging candidate, and a zero motion merging candidate, and
    wherein when the second coding block is split into the two sub-regions in a horizontal direction and the current sub-region is a bottom sub-region among the two sub-regions, a number of the merging candidates available for motion compensation of the current sub-region among the two sub-regions is less than a number of merging candidates available for motion compensation of a top sub-region among the two sub-regions.

* * * * *